United States Patent
Lee

(10) Patent No.: US 10,863,173 B2
(45) Date of Patent: Dec. 8, 2020

(54) INTRA PREDICTION MODE MAPPING METHOD AND DEVICE USING THE METHOD

(71) Applicant: Dolby Laboratories Licensing Corporation, San Francisco, CA (US)

(72) Inventor: Sun Young Lee, Seoul (KR)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 16/796,543

(22) Filed: Feb. 20, 2020

(65) Prior Publication Data

US 2020/0195922 A1    Jun. 18, 2020

Related U.S. Application Data

(63) Continuation of application No. 16/171,834, filed on Oct. 26, 2018, now Pat. No. 10,616,575, which is a
(Continued)

(30) Foreign Application Priority Data

Jan. 20, 2012 (KR) .......... 10-2012-0006841
Jan. 17, 2013 (KR) .......... 10-2013-0005333

(51) Int. Cl.
*H04N 11/02* (2006.01)
*H04N 19/11* (2014.01)
(Continued)

(52) U.S. Cl.
CPC .......... *H04N 19/11* (2014.11); *H04N 19/147* (2014.11); *H04N 19/157* (2014.11);
(Continued)

(58) Field of Classification Search
CPC ....................................................... H04N 19/11
(Continued)

(56) References Cited

U.S. PATENT DOCUMENTS 8,644,382 B2 * 2/2014 Tsukuba .............. H04N 19/174
                                                    375/240.12
9,100,649 B2 * 8/2015 Park ...................... H04N 19/70
(Continued)

FOREIGN PATENT DOCUMENTS

CN          101494792          7/2009
JP          2013-150329        8/2013
(Continued)

OTHER PUBLICATIONS

CN Office Action dated Jun. 14, 2017 for corresponding Chinese Patent Application No. 201380006073.5.
(Continued)

*Primary Examiner* — Leron Beck
(74) *Attorney, Agent, or Firm* — Wong & Rees LLP; Zhichong Gu

(57) ABSTRACT

The present invention relates to an intra prediction mode mapping method and a device using the method. The intra prediction mode includes: decoding flag information providing information regarding whether an intra prediction mode of a plurality of candidate intra prediction modes for the current block is the same as the intra prediction mode for the current block, and decoding a syntax component including information regarding the intra prediction mode for the current block in order to induce the intra prediction mode for the current block if the intra prediction mode from among the plurality of candidate intra prediction modes for the current block is not the same as the intra prediction mode for the current block. Thus, it is possible to increase the efficiency with which are images are decoded.

3 Claims, 12 Drawing Sheets

Related U.S. Application Data continuation of application No. 15/958,452, filed on Apr. 20, 2018, now Pat. No. 10,158,852, which is a continuation of application No. 15/812,567, filed on Nov. 14, 2017, now Pat. No. 9,986,238, which is a continuation of application No. 15/399,077, filed on Jan. 5, 2017, now Pat. No. 9,854,239, which is a continuation of application No. 14/368,224, filed as application No. PCT/KR2013/000370 on Jan. 17, 2013, now Pat. No. 9,554,130.

(51) Int. Cl.
| | | |
|---|---|---|
| H04N 19/70 | (2014.01) | |
| H04N 19/463 | (2014.01) | |
| H04N 19/157 | (2014.01) | |
| H04N 19/196 | (2014.01) | |
| H04N 19/147 | (2014.01) | |
| H04N 19/593 | (2014.01) | |
| H04N 19/176 | (2014.01) | |
| H04N 19/91 | (2014.01) | |
| H04N 19/159 | (2014.01) | |
| H04N 19/61 | (2014.01) | |

(52) U.S. Cl.
CPC ......... *H04N 19/159* (2014.11); *H04N 19/176* (2014.11); *H04N 19/196* (2014.11); *H04N 19/198* (2014.11); *H04N 19/463* (2014.11); *H04N 19/593* (2014.11); *H04N 19/70* (2014.11); *H04N 19/91* (2014.11); *H04N 19/61* (2014.11)

(58) Field of Classification Search
USPC ........................................ 375/240.01–230.29
See application file for complete search history.

(56) References Cited

U.S. PATENT DOCUMENTS

| | | | |
|---|---|---|---|
| 9,319,683 B2 * | 4/2016 | Lim | H04N 19/129 |
| 9,363,511 B2 * | 6/2016 | Zhang | H04N 19/593 |
| 2005/0089235 A1 | 4/2005 | Sakaguchi et al. | |
| 2009/0245371 A1 | 10/2009 | Choi et al. | |
| 2011/0268188 A1 | 11/2011 | Kim et al. | |
| 2012/0106636 A1 * | 5/2012 | Kim | H04N 19/46 |
| | | | 375/240.12 |
| 2012/0224777 A1 | 9/2012 | Kim et al. | |
| 2012/0314766 A1 * | 12/2012 | Chien | H04N 19/11 |
| | | | 375/240.12 |
| 2013/0089144 A1 | 4/2013 | Lee | |
| 2013/0114707 A1 * | 5/2013 | Seregin | H04N 19/11 |
| | | | 375/240.12 |
| 2013/0114712 A1 | 5/2013 | Yamamoto et al. | |
| 2013/0188695 A1 | 7/2013 | Maani et al. | |
| 2013/0266064 A1 * | 10/2013 | Zhang | H04N 19/463 |
| | | | 375/240.12 |
| 2014/0098867 A1 | 4/2014 | Park | |
| 2014/0119443 A1 | 5/2014 | Park | |

FOREIGN PATENT DOCUMENTS

| | | |
|---|---|---|
| JP | 6334634 B2 | 5/2018 |
| KR | 10-2009-0103675 | 10/2009 |
| KR | 10-2010-0081148 | 7/2010 |
| KR | 10-2011-0019855 | 3/2011 |
| KR | 10-2011-0057794 | 6/2011 |
| WO | 2003/105070 | 12/2003 |
| WO | 2012/008515 A1 | 1/2012 |
| WO | 2012/023762 A2 | 2/2012 |
| WO | 2012/087035 A2 | 6/2012 |
| WO | 2012/170812 A1 | 12/2012 |
| WO | 2013/037489 A1 | 3/2013 |
| WO | 2013/051903 A1 | 4/2013 |
| WO | 2013/062195 A1 | 5/2013 |
| WO | 2013/062196 A1 | 5/2013 |
| WO | 2013/067334 A2 | 5/2013 |
| WO | 2013/107419 A1 | 7/2013 |

OTHER PUBLICATIONS

Francois et al., "CE6b: Mode ranking for remaining mode coding with 2 or 3 MPMs", 7th Meeting, Nov. 21-30, 2011, Geneva, Switzerland. (Joint collaborative Team on Video coding of ITU-T SG. 16 WP3 and ISO/IEC JTC1/SC29/WGII).

JVC Kenwood Holdings, Inc., Tom Kumakura et al., "Fixing the number of mpm candidates," Jul. 14-22, 2011, Joint Collaborative Team on Video Coding (JCT-VC) of ITU-T SG16 WP3 and ISO/IEC JTC1/SC29/WG11, 6th meeting. Torino, Italy.

Non-Final Office Action dated Mar. 23, 2017, in U.S. Appl. No. 15/399,077.

Bross et al, "WD4: Working Draft 4 of High-Efficiency Video Coding", Jul. 14-22, 2011, Joint Collaborative Team on 4 Video Coding (JCT-VC) of ITU-T SG16 WP3 and ISO/IEC JTC1/SC29/WG11, Torino, Italy.

The extended European Search report dated Jul. 20, 2015 in European Patent Application No. 13738183.6.

Chuang et al., "Luma Intra Prediction Mode Coding", (Joint Collaborative Team on Video Coding(JCT-VC) of ITU-T 11 3G16 WP3 and ISO/IEC JTC1/SC29/WG11), 6th Meeting:Torino, IT, Jul. 15, 2011, JCTVC-F062_r2, pp. 1-5.

Ehsan Maani, et al., "Intra mode coding using logical mode numbering", Joint Collaborative Team on Video Coding (JCT-VC) of ITU-T SG16 WP3 and ISO/IEC JTC1/SC29/WG11; 8th Meeting: San Jose, CA, USA, Feb. 1-10, 2012; pp. 1-5.

JP Office Action dated Aug. 15, 2017 for corresponding Japanese Patent Application No. 2016-184854.

Non-Final Office Action dated Jun. 17, 2016, in U.S. Appl. No. 14/368,224.

Seregin, et al, "Intra mode parsing without access neighboring information", 6tII Meeting, Jul. 14-22, 2011, Torino, IT, [Joint collaborative Team on Video coding of ISO/IEC JTC1/SC29/WG11 and ITU-T SG.16).

Chien et al., "Parsing friendly intra mode coding" 6th Meeting, Jul. 14-22, 2011, Torino, Italy. (Joint collaborative Team on Video coding of ITU-T SG. 16 WPS and ISOMEC JTC1/SC29/WG11).

Edouard Francois, et al., "Modified Intra Mode Coding; Joint Collaborative Team on Video Coding (JCT-VC) of ITU-T SG16 WP3 and ISO/IEC JTC1/SC29/WG11"; 6th Meeting: Torino, IT, Jul. 14-22, 2011; pp. 1-8.

Jingjing Dai, et al., "Improved Signaling and Binarization of Chroma Intra Prediction Mode", Joint Collaborative Team on Video Coding (JCT-VC) of ITU-T SG16 WP3 and ISO/IEC JTC1/SC29/WG11; 4th Meeting: Daegu, KR, Jan. 20-28, 2011; pp. 1-5.

Maani et al., "Intro mode coding using logical mode numbering" 8th Meeting, Feb. 1-10, 2012, San Jose CA, 10 JSA. (Joint collaborative Team on Video coding of ITU-T SG.16 WP3 and ISO/IEC JTC1/SC29tWG11).

Notice of Allowance dated Sep. 7, 2016, in U.S. Appl. No. 14/358,224.

Canon Research Centre France, Edouard Francois et al., "Modified Intra Mode Coding," Jul. 14-22, 2011, Joint Collaborative Team on Video Coding (JCT-VC) of ITU-T SG16 WP3 and ISO/IEC JTC1/SC29/WG11, 6th meeting. Fori no, Italy.

Edouard Francois, et al., "CE6b: Mode ranking for remaining mode coding with 2 or 3 MPMs", Joint Collaborative Team on Video Coding (JCT-VC) of ITU-T SG16 WP3 and ISO/IEC JTC1/SC29/WG11; 7th Meeting; Geneva, CH, Nov. 21-30, 2011; pp. 1-5.

International Search Report dated Apr. 12, 2013 in International Patent Application No. PCT/KR2013/000370.

Lee, et al., "Simplification of intra prediction mode mapping method", 7th Meeting, Nov. 28-Dec. 2, 2011, Geneva, CH [Motion picture expert group or ISO/IEC JTC1/SC29/WG11).

Notice of Allowance dated Aug. 29, 2017, in U.S. Appl. No. 15/399,077.

(56) References Cited

OTHER PUBLICATIONS

Toru Kumakura, et al., "Fixing the number of mpm candidates", Joint Collaborative Team on Video Coding (JCT-VC) of ITU-T SG16 WP3 and ISO/IEC JTC1/SC29/WG11; 6th Meeting; Torino, IT, Jul. 14-22, 2011, pp. 1-8.

* cited by examiner rearranged table

FIG. 10

| intra prediction mode | codeNum |
|---|---|
| 0 | 0 |
| 1 | 1 |
| 2 (MPM1) | |
| 3 | 2 |
| 4 (MPM2) | |
| 5 (MPM3) | |
| 6 | 3 |
| 7 | 4 |
| 8 | 5 |
| 9 | 6 |
| 10 | 7 |

| codeNum | codeword |
|---|---|
| 0 | 0 |
| 1 | 11 |
| 2 | 1001 |
| 3 | 1011 |
| 4 | 1000 |
| 5 | 10100 |
| 6 | 101010 |
| 7 | 101011 |

INTRA PREDICTION MODE MAPPING METHOD AND DEVICE USING THE METHOD

CROSS-REFERENCE TO RELATED APPLICATION

This is a continuation of U.S. application Ser. No. 16/171,834 filed Oct. 26, 2018, which is a continuation of U.S. application Ser. No. 15/958,452 filed Apr. 20, 2018, now issued as U.S. Pat. No. 10,158,852, which is a continuation of U.S. application Ser. No. 15/812,567 filed Nov. 14, 2017, now issued as U.S. Pat. No. 9,986,238, which is a continuation of U.S. patent application Ser. No. 15/399,077 filed on Jan. 5, 2017, now issued as U.S. Pat. No. 9,854,239, which is a continuation of U.S. patent application Ser. No. 14/368,224, filed on Jun. 23, 2014, now issued as U.S. Pat. No. 9,554,130, which is the National Stage Entry of International Application PCT/KR2013/000370, filed on Jan. 17, 2013, and claims priority from and the benefit of Korean Patent Application No. 10-2012-0006841 filed on Jan. 20, 2012 and Korean Patent Application No. 10-2013-0005333 filed on Jan. 17, 2013, the disclosures of which are incorporated herein by reference in their entireties.

BACKGROUND OF THE INVENTION

Field of the Invention

The present invention relates to an intra-prediction mode mapping method and a device using the method, and more particularly, to an encoding and decoding method and apparatus.

Related Art

Recently, demand for high resolution, quality images such as high definition (HD) images and ultra-high definition (UHD) images has increased in various application fields. As video data has increasingly high resolution and high quality, an amount of data is increased, relative to existing video data. Thus, transmission of image data using a medium such as an existing wired/wireless wideband circuit or storing video data using an existing storage medium increases transmission costs and storage costs. In order to address such problems arising as video data has increasingly high resolution and high quality, highly efficient video compression techniques may be utilized.

Video compression techniques may include various techniques such as an inter-prediction technique of predicting a pixel value included in a current picture from a previous or subsequent picture of the current picture, an intra-prediction technique of predicting a pixel value included in a current picture using pixel information of the current picture, an entropy encoding technique of allocating a short code to a value having high frequency and allocating a long code to a value having low frequency, and the like. Video data may be effectively compressed and transmitted or stored through such video compression techniques.

SUMMARY OF THE INVENTION

A first aspect of the present invention provides an intra-prediction mode mapping method to increase video encoding efficiency.

A second aspect of the present provides an apparatus for performing an intra-prediction mode mapping method to increase video encoding efficiency.

In an aspect, an intra-prediction method may include: decoding flag information indicating whether one of a plurality of candidate intra-prediction modes with respect to a current block and an intra-prediction mode of the current block are identical; and when one of a plurality of candidate intra-prediction modes with respect to a current block and an intra-prediction mode of the current block are not identical, decoding a syntax element including information regarding the intra-prediction mode of the current block to derive the intra-prediction mode of the current block, wherein, the decoding of a syntax element including information regarding the intra-prediction mode of the current block to derive the intra-prediction mode of the current block is performed based on a table including intra-prediction mode information, the table is a table mapping intra-prediction modes and index information of the intra-prediction modes, and, in the table, when an intra-prediction mode is a planar mode, the intra-prediction mode is mapped to an index 0, when an intra-prediction mode is a DC mode, the intra-prediction mode is mapped to an index 1, and when intra-prediction modes are directional intra-prediction modes, the intra-prediction modes are mapped to indices 2 to 34 according to directivity of the intra-prediction modes.

The syntax element including information regarding an intra-prediction mode of a current block may be a value coded using fixed 5 bits, and the 5-bit information may indicate one of the remaining intra-prediction mode information, excluding a plurality of candidate intra-prediction modes with respect to the current block.

The plurality of candidate intra-prediction modes with respect to the current block may be three different intra-prediction modes derived based on intra-prediction modes derived based on neighbor blocks of the current block and an additional intra-prediction mode.

When the flag information is 1, the flag information may indicate that one of the candidate intra-prediction modes of the current block and the intra-prediction mode of the current block are identical, and when the flag information is 0, the flag information may indicate that the plurality of candidate intra-prediction modes of the current block and the intra-prediction mode of the current block are not identical.

The decoding of a syntax element including information regarding the intra-prediction mode of the current block to derive the intra-prediction mode of the current block may include: deriving the other remaining thirty-two intra-prediction mode information, excluding three intra-prediction modes as a plurality of candidate intra-prediction modes with respect to the current block, in the table; mapping syntax element including information regarding the intra-prediction mode of the current block to the other remaining thirty-two intra-prediction mode information; and setting one intra-prediction mode, among the other remaining thirty-two intra-prediction mode information, mapped to the syntax element, as an intra-prediction mode of the current block.

In another aspect, a video decoding apparatus may include: an entropy-decoding module configured to decode flag information indicating whether one of a plurality of candidate intra-prediction modes with respect to a current block and an intra-prediction mode of the current block are identical, and configured to decode a syntax element including information regarding the intra-prediction mode of the current block to derive the intra-prediction mode of the current block, when one of a plurality of candidate intra-prediction modes with respect to a current block and an intra-prediction mode of the current block are not identical; and a prediction module configured to derive the intra-prediction mode of the current block based on the decoded syntax element, when one of a plurality of candidate intra-prediction modes with respect to a current block and an intra-prediction mode of the current block are not identical, wherein the table is a table mapping intra-prediction modes and index information of the intra-prediction modes, and, in the table, when an intra-prediction mode is a planar mode, the intra-prediction mode is mapped to an index 0, when an intra-prediction mode is a DC mode, the intra-prediction mode is mapped to an index 1, and when intra-prediction modes are directional intra-prediction modes, the intra-prediction modes are mapped to indices 2 to 34 according to directivity of the intra-prediction modes.

The syntax element may be a value coded using fixed 5 bits, and the 5-bit information may indicate one of the remaining intra-prediction mode information, excluding a plurality of candidate intra-prediction modes with respect to the current block.

The plurality of candidate intra-prediction modes with respect to the current block may be three different intra-prediction modes derived based on intra-prediction modes derived based on neighbor blocks of the current block and an additional intra-prediction mode.

When the flag information is 1, the flag information may indicate that one of the candidate intra-prediction modes of the current block and the intra-prediction mode of the current block are identical, and when the flag information is 0, the flag information may indicate that the plurality of candidate intra-prediction modes of the current block and the intra-prediction mode of the current block are not identical.

The prediction module may derive the other remaining thirty-two intra-prediction mode information, excluding three intra-prediction modes as a plurality of candidate intra-prediction modes with respect to the current block, in the table, map syntax element including information regarding the intra-prediction mode of the current block to the other remaining thirty-two intra-prediction mode information, and set one intra-prediction mode, among the other remaining thirty-two intra-prediction mode information, mapped to the syntax element, as an intra-prediction mode of the current block.

As described above, the intra-prediction mode mapping method and apparatus using the method according to embodiments of the present invention may encode and decode intra-prediction mode information with a small number of bits, thus increasing video coding efficiency.

BRIEF DESCRIPTION OF THE DRAWINGS

FIG. 10 is a conceptual view illustrating a codeNum mapping and code mapping method excluding MPM according to an embodiment of the present invention;

DESCRIPTION OF EXEMPLARY EMBODIMENTS

Also, elements disclosed in the embodiments and drawings of the present invention are independently illustrated to show different characteristic functions, and it does not mean that each element is configured as separated hardware or a single software component. Namely, for the sake of explanation, respective elements are arranged to be included, and at least two of the respective elements may be incorporated into a single element or a single element may be divided into a plurality of elements to perform a function, and the integrated embodiment and divided embodiment of the respective elements are included in the scope of the present invention unless it diverts from the essence of the present invention.

Also, some of the elements may be optional to merely enhance the performance, rather than being essential to perform a constitutional function. The present invention may be implemented by using only the elements requisite for implement the essence of the present invention, excluding elements used to merely enhance the performance, and a structure including only the essential elements excluding the optional elements merely used to enhance the performance is also included in the scope of the present invention.

Figure 1:
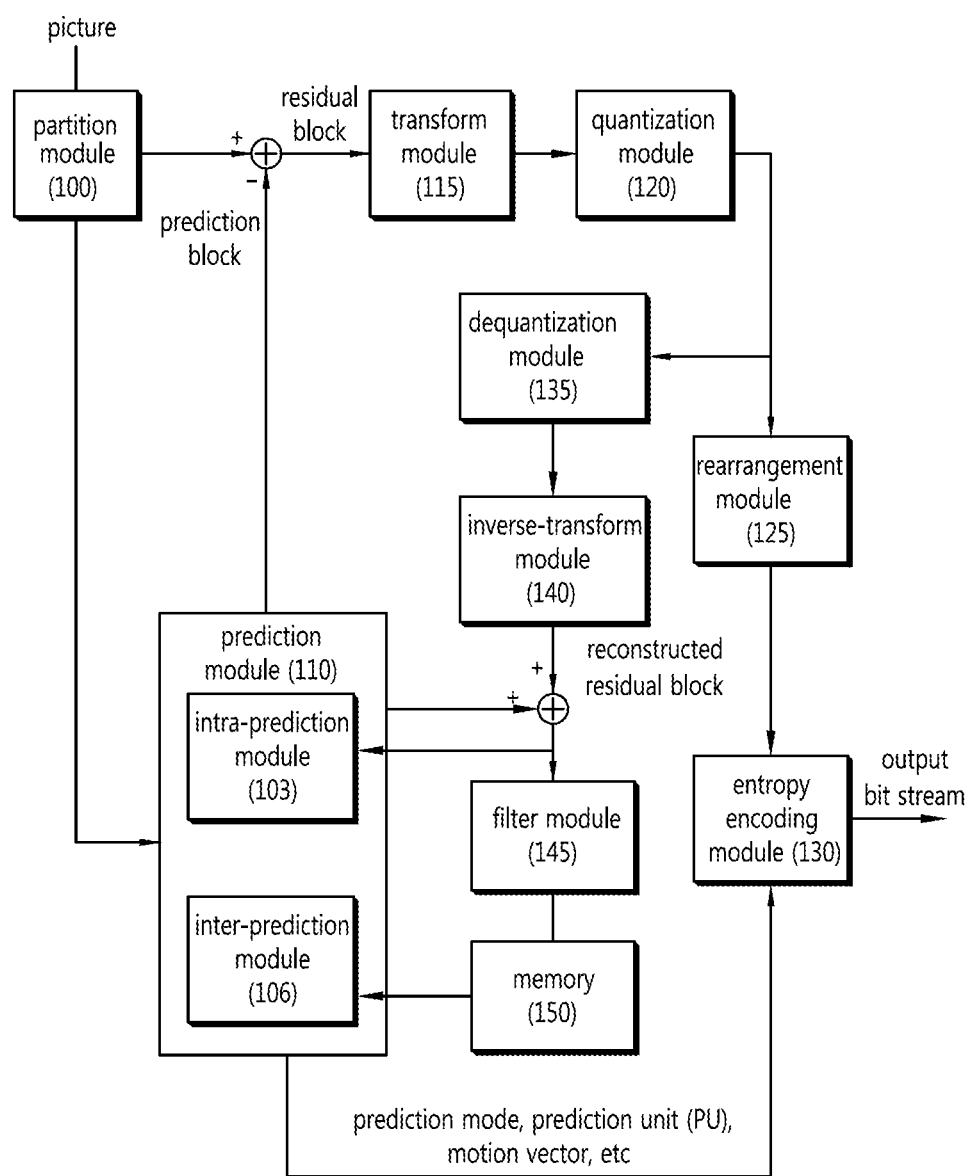
FIG. 1 is a block diagram illustrating an encoding apparatus according to an embodiment of the present invention.

FIG. 1 is a block diagram illustrating an encoding apparatus according to an embodiment of the present invention.

Referring to FIG. 1, an encoding apparatus includes a partition module 100, a prediction module 110, an intra-prediction module 103, an inter-prediction module 106, a transformation module 115, a quantization module 120, a rearrangement module 125, an entropy encoding module 130, a dequantization module 135, an inverse-transform module 140, a filter module 145, and a memory 150.

The encoding apparatus may be implemented by a video encoding method described in an exemplary embodiment of the present invention, but operations of some elements may not be performed for fast real-time encoding in order to reduce complexity of an encoder. For example, in performing intra-prediction by the prediction module, rather than a method of selecting an optimum intra-encoding method using every intra-prediction mode method to perform encoding in real time, a method of selecting one of a partial limited number of intra-prediction modes, as a final intra-prediction mode may be used. In another example, in performing intra-prediction or inter-prediction, prediction blocks may be limitedly used.

A unit of a block processed by the encoding apparatus may be a coding unit performing encoding, a prediction unit performing prediction, and a transform unit performing transformation. A coding unit may be expressed as CU (coding unit), a prediction unit may be expressed as PU (prediction unit), and a transform unit may be expressed as TU (transform unit).

The partition module 100 may partition a single picture into a plurality of combinations of a coding block, a prediction block, and a transform block, and select one of the plurality of combinations of a coding block, a prediction block and a transform block to split a picture. For example, in order to partition coding units (CU) in a picture, a recursive tree structure such as a QuadTree structure may be used. Hereinafter, in an embodiment of the present invention, a meaning of a coding block may be used as a meaning of a block performing decoding, as well as a meaning of a block performing encoding.

A prediction block may be a unit performing intra-prediction or inter-prediction. The block performing intra-prediction may be a square block having a size such as 2N×2N or N×N, or may be a rectangular block using short distance intra-prediction (SDIP). In a prediction block splitting method, a square block such as 2N×2N or N×N performing intra-prediction, a rectangular block such as 2N×N or N×2N obtained by bisecting a square prediction block to have the same shape, or prediction asymmetric motion partitioning (AMP) having an asymmetrical form may be used. A method for performing transformation by the transform module 115 may vary depending on a shape of a prediction block.

The prediction module 110 may include an intra-prediction module 103 performing intra-prediction and an inter-prediction module 106 performing inter-prediction. Whether to use inter-prediction or intra-prediction on a prediction block may be determined. A processing unit subjected to prediction and a unit of a processing block for which a prediction method is determined may be different. For example, in performing intra-prediction, a prediction mode may be determined based on a prediction block, and a process of performing prediction may be performed based on a transform block. A residual value (residual block) between a generated prediction block and the original block may be input to the transform module 115. Also, prediction mode information, motion vector information, or the like, used for prediction may be encoded by the entropy encoding module 130 together with the residual value and delivered to the decoder.

In case of using a pulse coded modulation (PCM) coding mode, the original block may be encoded as is and transmitted to the decoding module, without performing prediction through the prediction module 110.

The intra-prediction module 103 may generate an intra-predicted block based on a reference pixel existing around a current block (block as a prediction target). In order to derive an optimal intra-prediction mode with respect to the current block, an intra-predicted block with respect to the current block may be generated using a plurality of intra-prediction modes and one of the prediction blocks may be selectively used as a prediction block of the current block. In the intra-prediction method, an intra-prediction mode may include a directional prediction mode using reference pixel information according to a prediction direction and a non-directional mode not using directional information in performing prediction. A mode for predicting luminance information and a mode for predicting chrominance information may be different. In order to predict chrominance information, intra-prediction mode information predicting luminance information or predicted luminance signal information may be utilized.

In case of a current block on which intra-prediction is performed using a single intra-prediction mode, an intra-prediction mode of the current block may be predicted from intra-prediction mode information which has been used in performing intra-prediction on a neighboring block of the current block, and intra-prediction mode information of the current block may be encoded. Namely, the intra-prediction mode of the current block may be predicted from an intra-prediction mode of a prediction block existing around the current block. In order to predict an intra-prediction mode of the current block using mode information predicted from a neighbor block, the following methods may be used.

1) When an intra-prediction mode of a current block and an intra-prediction mode of a neighbor block are identical, predetermined flag information may be encoded to transmit information indicating that an intra-prediction mode of the current block and an intra-prediction mode of the neighbor block are identical.

2) When the intra-prediction mode of the current block and the intra-prediction mode of the neighbor block are different, intra-prediction mode information of the current block may be entropy-encoded to encode prediction mode information of the current block.

The intra-prediction mode of the neighbor block used to encode the intra-prediction mode of the current block in 1) and 2) may be defined as a term of a candidate intra-prediction mode and used.

In performing the methods 1) and 2), if the intra-prediction mode of the neighbor block is not available (for example, a neighbor block does not exist or a neighbor block has performed inter-prediction), a pre-set particular intra-prediction mode value may be set as an intra-prediction mode value to predict an intra-prediction mode of the current block.

The intra-prediction module 103 may generate an intra-predicted block based on a reference pixel information around the current block as pixel information of a current picture. Since a neighbor block of the current block is a block on which inter-prediction has been performed, and thus, a reference pixel is a pixel obtained by restoring a predicted pixel by performed inter-prediction. In such a case, the current block may be intra-predicted using a pixel of the neighbor block on which intra-prediction has been performed without using the corresponding pixel. Namely, when the reference pixel is not available, the unavailable reference pixel may be replaced with a different pixel so as to be used.

A prediction block may include a plurality of transform blocks. When a size of a prediction block and a size of a transform block are equal in perform intra-prediction, intra-prediction may be performed on the prediction block based on a pixel existing on the left of the prediction block, a pixel existing on a left upper side of the prediction block, and a pixel existing in an upper side of the prediction block. However, in a case in which a size of a prediction block and a size of a transform block are different and a plurality of transform blocks are included in the prediction block in performing intra-prediction, intra-prediction may be performed using a reference pixel determine based on the transform blocks.

Also, a single coding block may be partitioned into a plurality of prediction blocks, and only on a minimum coding block corresponding to a coding block having a minimum size, intra-prediction may be performed using N×N partitioning by which a single coding block is split into four square prediction blocks.

In the intra-prediction method, a prediction block may be generated after applying a mode dependent intra smoothing (MDIS) filter on a reference pixel according to an intra-prediction mode. Types of MDIS filter applied to the reference pixel may vary. The MDIS filter, an additional filter applied to an intra-predicted block after performing intra-prediction, may be used to reduce a difference existing between the reference pixel and the intra-predicted block generated after prediction is performed. In performing MDIS filtering, various filtering may be performed on a partial row included in the reference pixel and the intra-predicted block according to directivity of an intra-prediction mode.

According to an embodiment of the present invention, in performing intra-prediction on a current block according to a size of the current block, the number of available intra-prediction modes may vary. For example, the number of available intra-prediction modes may vary according to a size of a current block as a target of intra-prediction. Thus, in performing intra-prediction on a current block, a size of the current block may be determined and available intra-prediction modes may be determined accordingly to perform intra-prediction.

The inter-prediction module 106 may perform prediction with reference to information of a block included in at least one of a previous picture or a subsequent picture of a current picture. The inter-prediction module 106 may include a reference picture interpolating module, a motion estimating module, and a motion compensating module.

The reference picture interpolating module may receive reference picture information from the memory 150 and generate pixel information regarding integer pixel or smaller in the reference picture. In case of a luminance pixel, DCT-based 8-tap interpolation filter using a filter factor varied to generate pixel information regarding an integer pixel or smaller in units of ¼ pixel. In case of a chrominance signal, a DCT-based 4-tap interpolation filter using a filter factor varied to generate pixel information regarding an integer pixel or smaller in units of ⅛ pixel.

The inter-prediction module 106 may perform motion prediction based on a reference picture interpolated by the reference picture interpolating module. In order to calculate a motion vector, various methods such as full search-based block matching algorithm (FBMA), three step search (TSS), new tree-step search algorithm (NTS), or the like, may be used. A motion vector may have a motion vector value in units of ½ or ¼ pixel based on an interpolated pixel. The inter-prediction module 106 may perform prediction on a current block by applying one of various inter-prediction methods. The inter-prediction methods may include, for example, a skip method, a merge method, an advanced motion vector prediction (AMVP) method, or the like.

A residual block including residual information as a difference value between a generated predicted block (intra-predicted block or inter-predicted block) which has been generated by the prediction module 110 and the original block may be generated.

The generated residual block may be input to the transform module 115. The transform module 115 may transform the original block and the residual block including the residual information of the predicted block through a transform method such as discrete cosine transform (DCT) or discrete sine transform (DST). Whether to apply DCT or DST to transform the residual block may be determined based on intra-prediction mode information of the prediction block used to generate the residual block and size information of the prediction block. Namely, the transform module 115 may differently apply a transform method according to a size of a prediction block and a prediction method.

The quantization module 120 may quantize values which have been transformed into a frequency domain by the transform module 115. A quantization coefficient may vary according to a block or importance of an image. A value calculated by the quantization module 120 may be provided to the dequantization module 135 and the rearrangement module 125.

The rearrangement module 125 may rearrange a coefficient value with respect the quantized residual value. The rearrangement module 125 may change a two-dimensional (2D) block type coefficient into a one-dimensional (1D) vector form through a coefficient scanning method. For example, the rearrangement module 125 may scan from a DC coefficient up to a coefficient of a high frequency domain by using a zigzag scan method to change them into a 1D vector form. According to a size of a transform unit and an intra-prediction mode, a vertical scan method of scanning 2D block type coefficients in a column direction or a horizontal scan method of scanning 2D block type coefficients in a row direction, rather than the zigzag scan method, may be used. Namely, which one of the zigzag scan method, the vertical scan method, and the horizontal scan method is to be used may be determined according to a size of a transform unit and an intra-prediction mode.

The entropy encoding module 130 may perform entropy encoding based on the values calculated by the rearrangement module 125. For example, various encoding methods such as exponential Golomb, context-adaptive variable length coding (CAVLC), and context-adaptive binary arithmetic coding (CABAC) may be used as entropy encoding.

The entropy encoding module 130 may receive various types of information such as residual value coefficient information of a coding block and block type information, prediction mode information, partitioning unit information, prediction block information and transmission unit information, motion vector information, reference frame information, block interpolation information, filtering information, and the like, from the rearrangement module 125 and the prediction module 110, and perform entropy encoding thereon based on a predetermined coding method. Also, the entropy encoding module 130 may entropy-encode a coefficient value of a coding unit input from the rearrangement module 125.

The entropy encoding module 130 may perform entropy coding through a high efficiency binarization (HEB) method using CABAC or a high throughput binarization (HTB) method utilizing CAVLC factor binarization method for bypass coding of CABAC.

The entropy-encoding module 130 performs binarization on intra-prediction mode information to encode the intra-prediction mode information of the current block. The entropy-encoding module 130 may include a codeword mapping module for performing such a binarization operation, and binarization may be performed variously according to a size of a prediction block performing intra-prediction. The codeword mapping module may adaptively generate a codeword mapping table through binarization operation or may have a codeword mapping table stored therein in advance. In another embodiment, the entropy-encoding module 130 may express the intra-prediction mode information of the current block using a codeNum mapping module performing codeNum mapping and a codeword mapping module performing codeword mapping. The codeNum mapping module and the codeword mapping module may generate a codeNum mapping table and a codeword mapping table, or may have a codeNum mapping table and a codeword mapping table stored therein.

The dequantization module 135 and the inverse-transform module 140 may dequantize the values quantized by the quantization module 120 and inverse-transforms values transformed by the transform module 115. Residual values generated by the dequantization module 135 and the inverse-transform module 140 may be added with the prediction block predicted through the motion estimation module, the motion compensation module, and the intra-prediction module included in the prediction module to generate a reconstructed block.

The filter module 145 may include at least one of a deblocking filter, an offset compensation module, and an adaptive loop filter (ALF).

The deblocking filter 145 may remove block distortion generated due to a boundary between blocks in the reconstructed picture. In order to determine whether to perform deblocking, whether to apply a deblocking filter to a current block based on pixels included in some columns and rows included in a block may be determined. In a case in which the deblocking filter is applied to the block, a strong filter or a weak filter may be applied according to strength of required deblocking filtering. Also, in applying the deblocking filter, when vertical filtering and horizontal filtering are performed, horizontal directional filtering and vertical directional filtering may be processed concurrently.

The offset compensation module may compensate for an offset with an original image by pixels with respect to a deblocked image. In order to perform offset compensation on a specific picture, a method of dividing pixels included in an image into a predetermined number of regions, determining a region in which offset is to be performed, and applying offset to the corresponding region, or a method of applying offset in consideration of edge information of each pixel may be used.

The ALF may perform filtering based on a value obtained by comparing the filtered reconstructed image and the original image. Pixels included in an image may be divided into a predetermined group, a filter to be applied to a corresponding group may be determined to differentially filtering each group. Information regarding whether to apply the ALF may be transmitted by coding unit (CU), and a size and a coefficient of the ALF to be applied may be vary according to each block. The ALF may have various shapes, and the number of coefficients included in the filter may also vary. Filtering-related information (filter coefficient information, ALF ON/OFF information, filter shape information) of the ALF may be included in a form of bit stream in a predetermined parameter set and transmitted.

The memory 150 may store a reconstructed block or picture calculated through the filter module 145, and the stored reconstruction block or picture may be provided to the prediction module 110 when inter-prediction is performed.

Figure 2:
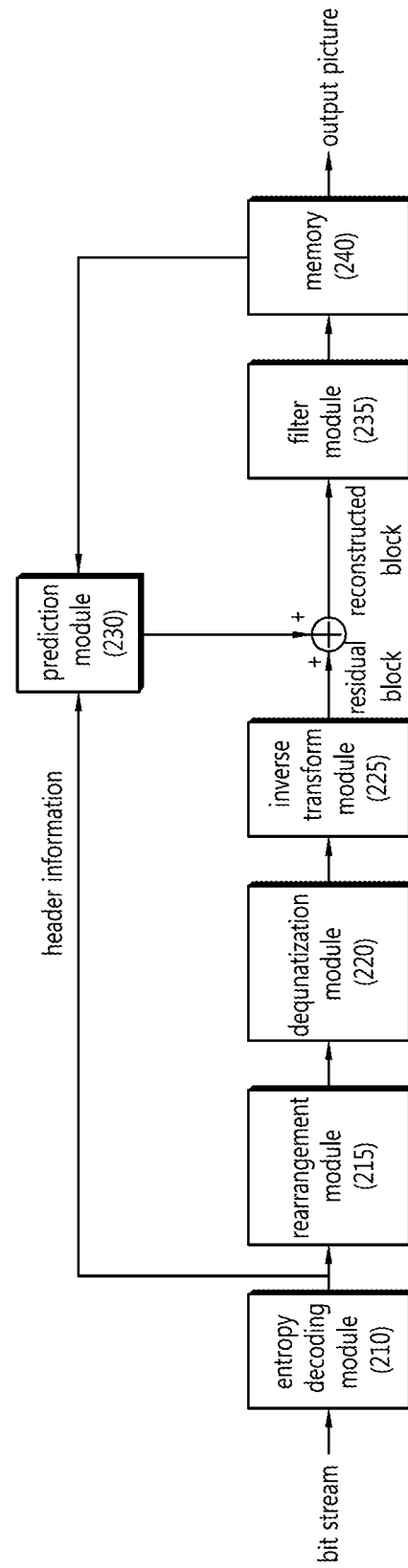
FIG. 2 is a block diagram illustrating a decoder according to an embodiment of the present invention.

FIG. 2 is a block diagram illustrating a decoder according to an embodiment of the present invention.

Referring to FIG. 2, the decoder may include an entropy decoding module 210, a rearrangement module 215, a dequantization module 220, an inverse-transform module 225, a prediction module 230, a filter module 235, and a memory 240.

When a bit stream is input from an encoder, the input bit stream may be decoded in a procedure opposite to that of the encoder.

The entropy decoding module 210 may perform entropy decoding in a procedure opposite to that of the entropy coding by the entropy coding module of the encoder. Information for generating a prediction block, among the information decoded by the entropy decoding module 210 may be provided to the prediction module 230, and the residual value obtained after performing the entropy decoding by the entropy decoding module may be input to the rearrangement module 215.

Like the entropy encoding module, the entropy decoding module 210 may perform inverse-transform using at least one of the HEB method using CABAC and HTB method utilizing a CALVAC factor coding method.

The entropy decoding module 210 may decode information related to intra-prediction and inter-prediction performed by the encoder. The entropy-encoding module may include a codeword mapping module to include a codeword mapping table for generating a received codeword as an intra-prediction mode number. The codeword mapping table may be stored in advance or may be adaptively generated. In case of using a codeNum mapping table, a codeNum mapping module may be further provided to perform codeNum mapping.

The rearrangement module 215 may perform rearranging based on the method of rearranging an entropy-decoded bit stream by the entropy decoding module 210. Coefficients expressed in the form of a 1D vector may be reconstructed into coefficients in the form of a 2D block and realigned. The rearrangement module 215 may be provided with information related to coefficient scanning performed in the encoding module, and perform rearrangement through a method of reversely scanning based on the scanning order performed in the corresponding encoding module.

The dequantization module 220 may perform dequantization based on a quantization parameter provided from the encoder and the realigned coefficient value of the block.

The inverse-transform module 225 may perform inverse-DCT and inverse-DST on the DCT and the DST performed by the transform module on the quantization results performed by the encoder. The inverse-transform may be performed based on a transmit unit determined by the encoder. The transform module 115 of the encoder may selectively perform DCT and DST according to a plurality of information such as a prediction method, a size of a current block, a prediction direction, and the like, and the dequantization module 225 of the decoder may perform inverse transform based on the information transformed by the transform module of the encoder.

When the transform is performed, the transform may be performed based on coding unit (CU), rather than based on the transform unit (TU).

The prediction module 230 may generate a prediction block based on the prediction block generation-related information provided from the entropy decoding module 210 and the previously decoded block or picture information provided from the memory 240.

As described above, like the operation in the encoder, in performing intra-prediction, when a size of a prediction block and a size of a transform block are equal, intra-prediction is performed on a prediction block based on pixels existing on the left of the prediction block, pixels existing in left upper side of the prediction block, and pixels existing in an upper side of the prediction block. However, in performing intra-prediction, when a transform block is included in a prediction block, intra-prediction may be performed by using a reference pixel based on the transform block. Also, as described above, intra-prediction using N×N partitioning only on a minimum coding block may be used.

The prediction module 230 may include a prediction unit discriminating module, an inter-prediction module, and an intra-prediction module. The prediction unit discriminating module may receive various types of information such as prediction unit information input from the entropy decoding module, prediction mode information of an intra-prediction method, a motion prediction-related information of an inter-prediction method, and the like, input from the entropy decoding module, discriminate prediction block from a current coding block, and discriminate whether a prediction block is to perform inter-prediction or intra-prediction. The inter-prediction module may perform inter-prediction on a current prediction block based on information included in at least one picture among a previous picture and a subsequent picture of a current picture including a current prediction block by using information required for inter-prediction of the current prediction block provided from the encoder.

In order to perform inter-prediction, based on a coding block, which one of a skip mode, a merge mode, and an AMVP mode corresponds to a motion prediction method of a prediction block included in the corresponding coding block may be determined.

The intra-prediction module may generate a prediction block based on pixel information of the current picture. In a case in which a prediction block is a prediction block which has performed intra-prediction, intra-prediction may be performed based on intra-prediction mode information of the prediction block provided from the encoder. The intra-prediction module may include an MDIS filter, a reference pixel interpolation module, and a DC filter. The MDIS filter is a part performing filtering on a reference pixel of a current block, and whether to apply the filter may be determined according to a prediction mode of a current PU and applied. MDIS filtering may be performed on the reference pixel of the current block by using the prediction mode of the prediction block and the MDIS filter information provided from the encoder. In a case in which the prediction mode of the current block is a mode in which MDIS filtering is not performed, the MDIS filter may not be applied. Also, like the encoder, after generating a prediction block, filtering may be performed additionally together with a reference pixel.

When the prediction mode of the prediction block is a prediction block that performs intra-prediction based on a pixel value obtained by interpolating the reference pixel, the reference pixel interpolation module may interpolate the reference pixel to generate a reference pixel of a pixel unit below an integer value. In a case in which the prediction mode of the current prediction block is a prediction mode in which a prediction block is generated without interpolating the reference pixel, the reference pixel may not be interpolated. In a case in which the prediction mode of the current block is a DC mode, the DC filter may generate a prediction block through filtering.

The reconstructed block or picture may be provided to the filter module 235. The filter module 235 may include a deblocking filter, an offset compensation module, and an ALF.

Information regarding whether a deblocking filter has been applied to the corresponding block or picture and information regarding whether a strong filter or a weak filter has been applied if the deblocking filter has been applied may be received from the encoder. The deblocking filter of the decoder may receive deblocking filter-related information provided form the encoder and the decoder may perform deblocking filtering on the corresponding block. Like in the encoder, first, vertical deblocking filtering and horizontal deblocking filtering may be performed, and at least one of vertical deblocking and horizontal deblocking may be performed in an overlap portion. Vertical deblocking filtering or horizontal deblocking filtering which has not been performed previously may be performed in a portion in which vertical deblocking filter and horizontal deblocking filtering overlap. Through the deblocking filtering process, parallel processing of the deblocking filtering may be performed.

The offset compensation module may perform offset compensation on the reconstructed image based on a type of offset compensation applied to the image during encoding, offset value information, and the like.

The ALF may perform filtering based on a value obtained by comparing the image reconstructed after filtering and the original image. Based on information whether ALF has been applied, ALF coefficient information, and the like, provided from the encoder, ALF may be applied to a CU. Such ALF information may be included in a specific parameter set and provided.

The memory 240 may store the reconstructed picture or block so as to be used as a reference picture or reference block, and or provide the reconstructed picture to the output module.

As described above, in the embodiment of the present invention, a coding unit (CU) is used as a term of coding block, but it may also be a block of performing decoding as well as encoding. Hereinafter, an intra-prediction method according to an embodiment of the present invention described with reference to FIGS. 3 through 12 may be implemented according to functions of each mode described above with reference to FIGS. 1 and 2 and such encoder and decoder may fall within the scope of the present invention.

An intra-prediction mode of a current prediction block may be predicted from an intra-prediction mode of a neighbor block. Such a prediction method of an intra-prediction mode is called a most probable mode (MPM). A first MPM and a second MPM may be set based on an intra-prediction mode of a block existing on the left and in an upper side of the current block or an intra-prediction mode used frequently, and when an intra-prediction mode of the current block is identical to at least one of intra-prediction modes of the first MPM and the second MPM, information prev_intra_pred_flag indicating that the intra intra-prediction mode of the current block is identical to the intra-prediction mode of the MPM is used, and to which of the intra-prediction modes among the first MPM and the second MPM the intra-prediction mode of the prediction block is identical may be indicated through mpm_idx information. When the intra-prediction mode of the MPM is not identical to the intra-prediction mode of the current block, information regarding the intra-prediction mode of the current block may be encoded with rem_intra_luma_pred_mode.

Figure 3:
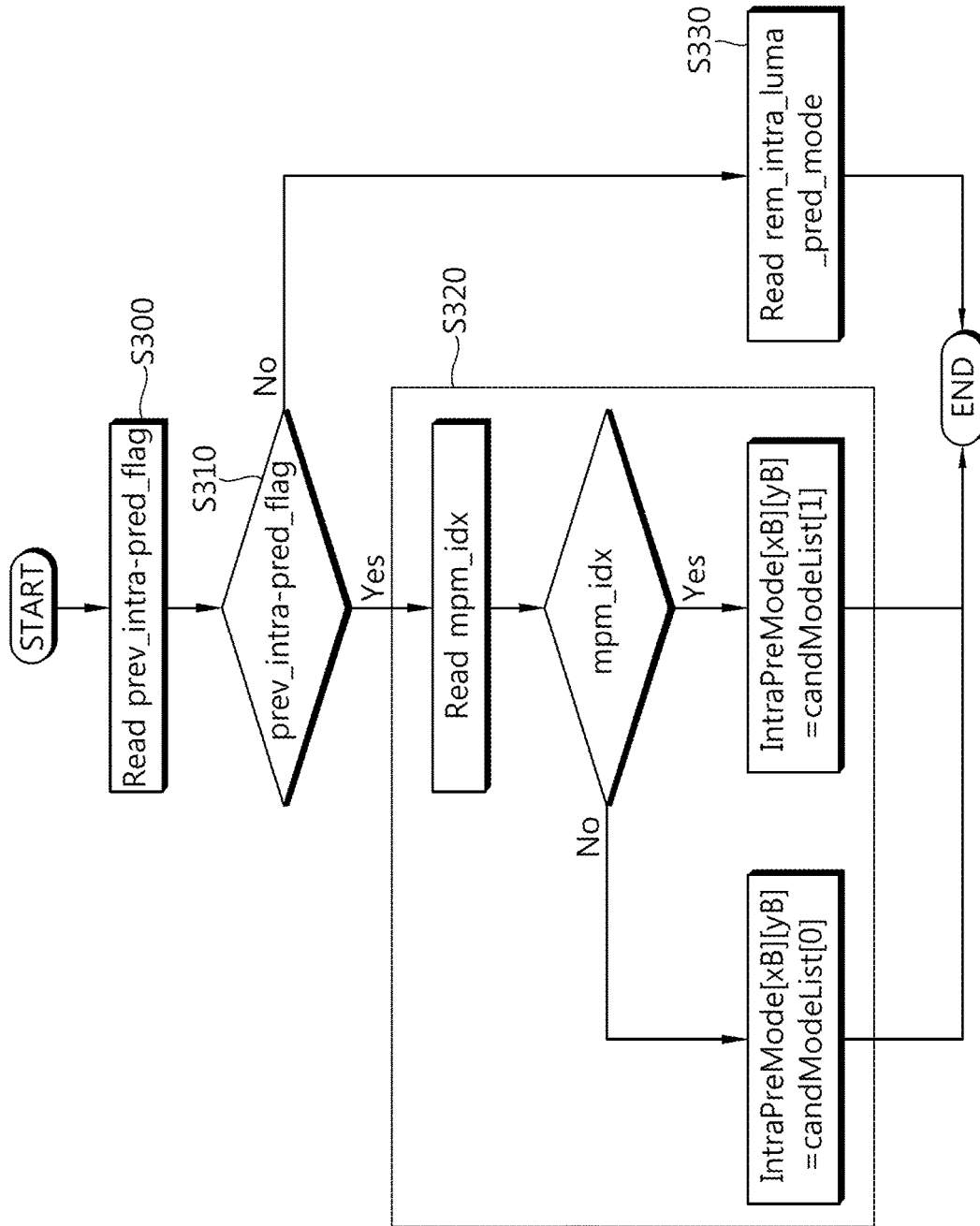
FIG. 3 is a flow chart illustrating a method for decoding an intra-prediction mode of a current prediction module according to an embodiment of the present invention.

FIG. 3 is a flow chart illustrating a method for decoding an intra-prediction mode of a current prediction unit according to an embodiment of the present invention.

Referring to FIG. 3, the foregoing prev_intra_pred_flag information may be decoded to decode intra-prediction mode information of the current block (step S300).

It is determined whether the decoded prev_intra_pred_flag information is 1 or 0 (step S300).

In an embodiment of the present invention, when the prev_intra_pred_flag information is 1, it is determined that the MPM and the intra-prediction mode of the current block are identical, and when the prev_intra_pred_flag information is 0, it is determined that the MPM and the intra-prediction mode of the current block are different. However, any other binarization method or information display method with respect to the prev_intra_pred_flag information may also be used.

When the intra-prediction mode of the current block and the intra-prediction mode of the MPM are determined to be identical through the prev_intra_pred_flag, the mpm_idx may be decoded to obtain information regarding to which of intra-prediction modes of the first MPM and the second MPM the intra-prediction mode of the current block is identical (step S320). When it is determined that the intra-prediction mode of the current block and the intra-prediction mode of the MPM are not identical through the prev_intra_pred_flag, rem_intra_luma_pred_mode, remaining mode information, may be decoded to obtain intra-prediction mode information of the current block (step S330).

In order to encode/decode the rem_intra_luma_pred_mode information, codeword information mapped to the intra-prediction mode may be used. Table 1 shows Exp-Golomb encoding method, one of methods of binarizing intra-prediction mode information.

TABLE 1

| codeword | codenum |
|----------|---------|
| 1        | 0       |
| 010      | 1       |
| 011      | 2       |
| 00100    | 3       |
| 00101    | 4       |
| 00110    | 5       |
| ...      | ...     |

Referring to Table 1, as the code numbers are smaller on the codeword mapping table, they may be mapped to shorter codewords. Namely, it can be seen that, when a short codeword is mapped to frequently generated information, the same information may be expressed with a shorter bit stream, and thus, encoding/decoding efficiency may increase.

Table 2 shows order of intra-prediction modes according to an embodiment of the present invention. Table 2 may be expressed like Table 3.

TABLE 2

| Intra prediction mode | Associated names |
|-----------------------|------------------|
| 0                     | Intra_Planar     |
| 1                     | Intar_DC         |
| 2                     | Intra_Vertical   |

TABLE 2-continued

| Intra prediction mode | Associated names |
|-----------------------|------------------|
| 3                     | Intra_Hotizontal |
| otherwise (4 . . . 34) | Intra_Angular   |

TABLE 3

| Intra prediction mode | Associated names |
|-----------------------|------------------|
| 0                     | Intra_Planar     |
| 1                     | Intar_DC         |
| otherwise (2 . . . 34) | Intra_Angular   |

Figure 4:
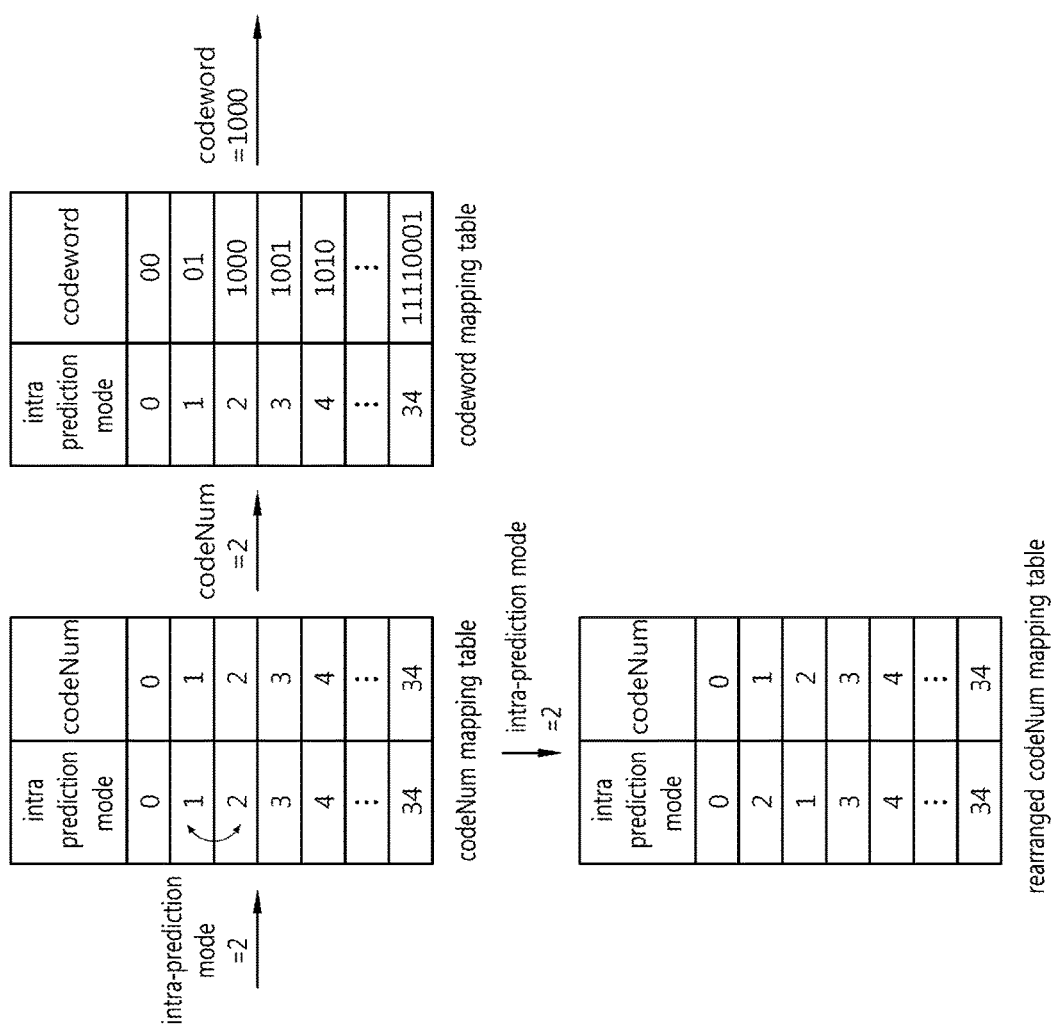
FIG. 4 is a conceptual view illustrating a method for encoding an intra-prediction mode according to an embodiment of the present invention.

Table 4 shows mapping between intra-prediction modes and codewords. In FIG. 4, codewords are randomly set and information regarding an intra-prediction mode of a current picture may be mapped using any other codewords within the scope of the essence of the present invention.

TABLE 4

| Intra prediction mode | Associated names | Codeword |
|-----------------------|------------------|----------|
| 0                     | Intra_Planar     | 1        |
| 1                     | Intar_DC         | 010      |
| 2                     | Intra_Horizontal | 011      |
| 3                     | Intar_Vertical   | 00100    |
| otherwise (4 . . . 34) | Intra_Angular   | . . .    |

Referring to Table 4, in the method of mapping intra-prediction modes and codewords according to an embodiment of the present invention, shorter codewords may be mapped to frequently generated intra-prediction modes, and thus, frequently generated intra-prediction modes may have shorter codewords.

Hereinafter, a shortest codeword or first mapped codeword based on generated order may be defined as a first codeword, and second, third, fourth, and nth codewords, or the like, may be expressed in sequence. Namely, a length of the nth codeword may be shorter than or equal to that of (n+1)th codeword, but the length of the nth codeword may not be greater than that of the (n+1)th codeword (here, n is an integer).

In case of coding according to an intra-prediction method, a planer mode or a DC mode, non-directional intra-prediction mode among intra-prediction modes, are frequently used, while a directional intra-prediction mode occurs relatively unfrequently. Thus, in an embodiment of the present invention, a shorter codeword is mapped to a non-directional intra-prediction mode and a codeword longer than a codeword mapped to a non-directional intra-prediction mode is mapped to a directional intra-prediction mode, thereby increasing video encoding and decoding efficiency.

Table 5 and Table 6 show various binary coding methods according to intra-prediction modes according to an embodiment of the present invention.

TABLE 5

| Intra prediction mode | Prefix(unary code) | Remainder(fixed length) |
|-----------------------|--------------------|-------------------------|
| 0-1                   | 0                  | x (1 bit)               |
| 2-5                   | 10                 | xx (2 bits)             |
| 6-9                   | 110                | xx (2 bits)             |
| 10-18                 | 111                | xxx (3 bits)            |

TABLE 6

| Intra prediction mode | Prefix(unary code) | Remainder(fixed length) |
|---|---|---|
| 0-1 | 0 | x (1 bit) |
| 2-5 | 10 | xx (2 bits) |
| 6-13 | 110 | xx (2 bits) |
| 14-21 | 1110 | xxx (3 bits) |
| 22-34 | 1111 | xxxx (4 bits) |

Table 5 shows a binarization method for expressing intra-prediction modes in case of using 19 modes as intra-prediction modes, and Table 6 shows a binarization method for expressing intra-prediction modes in case of using 35 modes as intra-prediction modes.

Referring to Table 5 and Table 6, a unary code and a fixed length may be used as a binary coding method for expressing intra-prediction modes of a current block. Referring to Table 5, when an intra-prediction mode is 0 or 1, a prefix using a unary code may be fixed to 0 and a fixed length for discriminating between 0 and 1, intra-prediction modes, may be expressed by 1 bit with 0 or 1. Also, when intra-prediction modes are 2 to 5, a prefix using a unary code may be fixed to 10 and a fixed length for discriminating among the intra-prediction modes 2 to 5 may be expressed by 2 bits. In this manner, codewords and intra-prediction modes may be mapped using a unary code and a fixed length. Table 6 may also binarize intra-prediction mode information in this manner to express the same.

Table 5 and Table 6 may also use a method in which a number of an intra-prediction mode is smaller, it is generated as a shorter codeword when binarized. Thus, according to an embodiment of the present invention, by disposing a frequently generated intra-prediction mode in an intra-prediction mode having a smaller number, corresponding information may be expressed with a small amount of bits, increasing coding efficiency.

FIG. 4 is a conceptual view illustrating a method for encoding an intra-prediction mode according to an embodiment of the present invention.

Referring to FIG. 4, according to an embodiment of the present invention, a codeNum mapping table may be used in encoding an intra-prediction mode.

Unlike the embodiment of Table 5 or Table 6 as described above, in case of using a codeNum mapping table, when a certain intra-prediction mode is determined, t-th determined intra-prediction mode and (t−1)th intra-prediction mode in the codeNum mapping table are swapped to raise a ranking of the frequently generated intra-prediction mode in the codeNum mapping table, whereby when a subsequent intra-prediction mode is positioned in the frequently generated intra-prediction mode, a smaller number of codeNum may be allocated. As a result, a shorter codeword may be mapped to the corresponding codeNum. Namely, the codeNum mapping table rearranged by raising the codeNum ranking of the t-th intra-prediction mode may be used when an intra-prediction is performed on a next prediction block. Referring to FIG. 4, the determined intra-prediction mode is 2, and codeNum 2 mapped to the #2 intra-prediction mode is read from the codeNum mapping table and a codeword ("1000") mapped to the #2 codeNum in the codeword mapping table is output as a result value of the #2 intra-prediction mode. Also, in the codeNum mapping table, the #2 intra-prediction mode and the immediately upper #1 intra-prediction mode are swapped, so that the codeNum for the #2 intra-prediction mode is corrected to #1 and the codeNum for the #1 intra-prediction mode is corrected to #2. The rearranged codeNum mapping table is used to intra-prediction mode coding of a next prediction block. In another embodiment, whether to swap t-th and (t−1)th intra-prediction modes is determined based on frequency of each of the t-th and (t−1)th intra-prediction modes. Namely, when the frequency of the t-th intra-prediction mode is greater than that of the (t−1)th intra-prediction mode, the t-th and (t−1)th intra-prediction modes are swapped and the rearranged codeNum mapping table may be used when intra-prediction is performed on a next prediction block. Conversely, when the frequency of the t-th intra-prediction mode is smaller than that of the (t−1)th intra-prediction mode, the two intra-prediction modes are not swapped and a current codeNum mapping table may be used when intra-prediction is performed on a next prediction block. In this case, in order to prevent a frequency of every intra-prediction mode from increasing infinitely, frequency of every intra-prediction mode may be reduced at the same rate periodically. A process (for example, for determining a codeword) other than the swapping process with respect to an intra-prediction mode based on frequency may be the same as the foregoing embodiment (namely, swapping immediately without using frequency).

In FIG. 4, for the purposes of description, it is assumed that intra-prediction mode numbers and codeNum numbers of the codeNum mapping table are identical, but in another embodiment, an initial codeNum mapping table mapping intra-prediction mode numbers and codeNum may be pre-determined and codeNum numbers different from those of intra-prediction modes may be mapped to intra-prediction modes.

Referring to FIG. 4, when a certain intra-prediction mode is determined, the intra-prediction mode may be mapped to a codeNum value of the codeNum mapping table. The mapped codeNum value may be mapped to a codeword value through a codeword mapping table.

Figure 5:
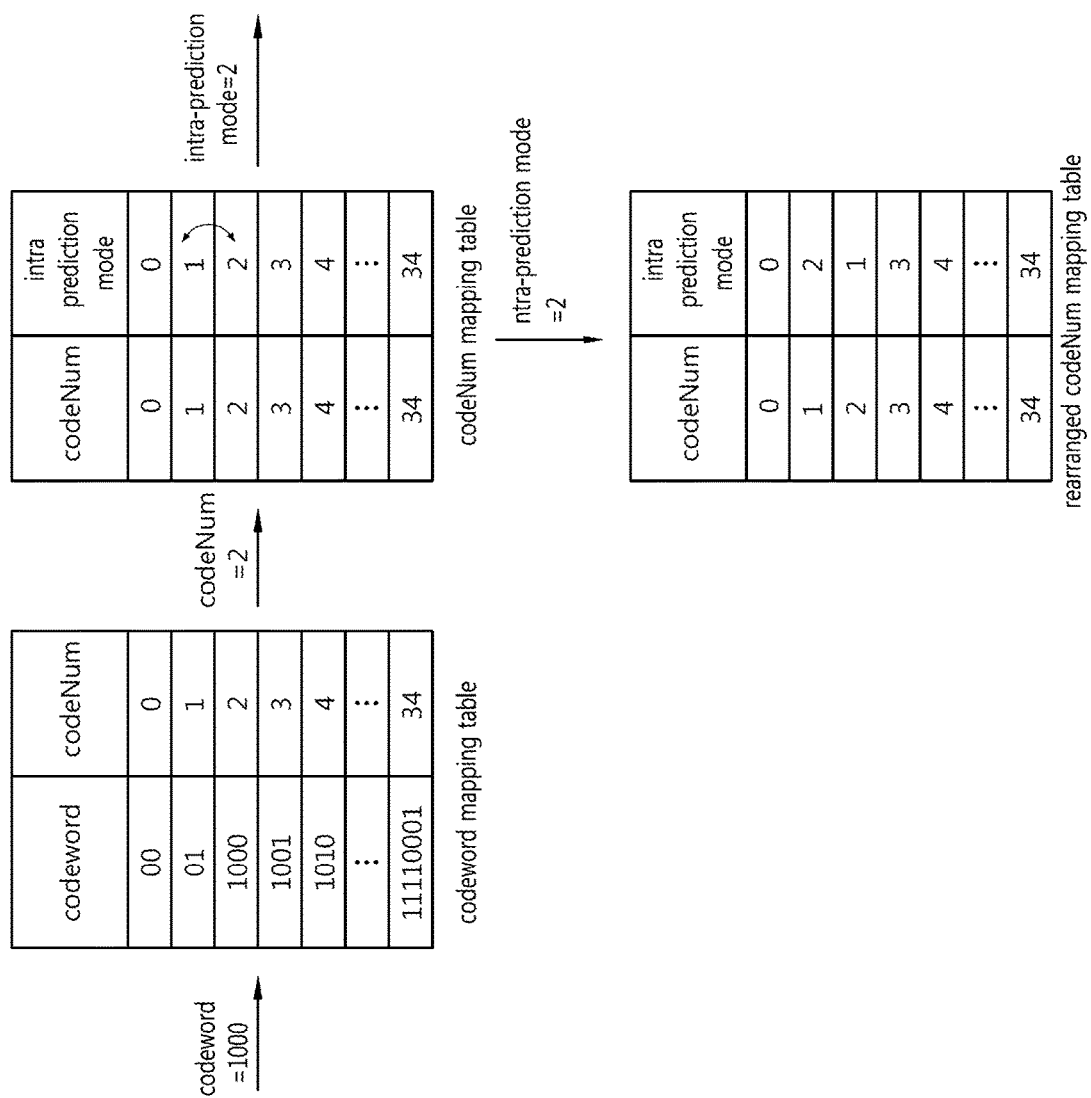
FIG. 5 is a conceptual view illustrating a method for decoding an intra-prediction mode according to an embodiment of the present invention.

FIG. 5 is a conceptual view illustrating a method for decoding an intra-prediction mode according to an embodiment of the present invention.

Referring to FIG. 5, the decoder has an initial codeword mapping table and an initial codeNum mapping table identical to those of the encoder. The decoder reads a codeword from a bit stream and obtains a mapped codeNum value from the codeword mapping table based on the corresponding codeword, and when an intra-prediction mode mapped to the codeNum is obtained from the codeNum mapping table, the decoder may finally determine an intra-prediction mode of a current block. During the decoding operation, when a certain intra-prediction mode is determined in the same manner as that of the encoder, swapping may be performed on the intra-prediction mode in the codeNum mapping table.

When the foregoing method is performed, in order to prevent unnecessary swapping, a value of the initial codeNum mapping table is important. The reason is because such a table may be re-initialized in a certain unit such as a slice or a frame, swapping needs to be performed after initialization to generate a codeNum mapping table reflecting the characters of a current slice or frame. Thus, it is important to map a smaller codeNum value to a frequently generated intra-prediction mode value in configuring a codeNum mapping table mapping intra-prediction modes and codeNum values. According to an embodiment of the present invention, a smaller codeNum number is mapped to a more frequently generated intra-prediction mode number, and as a result, a length of a codeword with respect to the intra-prediction mode may be reduced to obtain coding efficiency.

Figure 6:
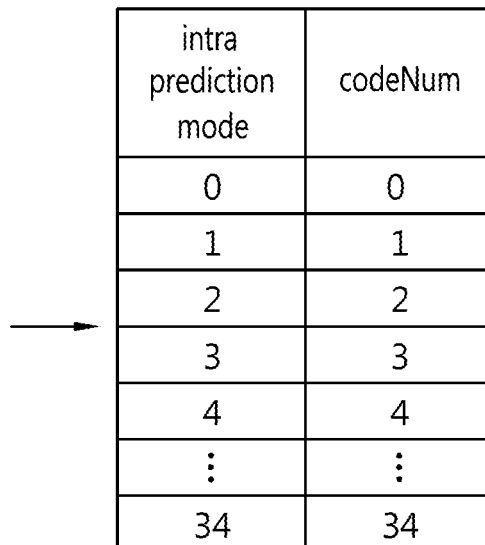
FIG. 6 is a conceptual view illustrating a case not using a codeNum mapping table according to an embodiment of the present invention.

FIG. 6 is a conceptual view illustrating a case using a codeNum mapping table differently according to an embodiment of the present invention.

Referring to FIG. 6, in binary-coding an intra-prediction mode, binary-coding may be performed without using an MPM. Namely, a method of rearranging codeNum mapping table based on intra-prediction mode information of blocks existing on the left and in an upper side of a specific prediction block, without generating flag information for an MPM, may be used. For example, when an intra-prediction mode of blocks existing on the left and in the upper side are 2 and 3, respectively, a method of configuring a codeNum mapping table in which 2 and 3 are positioned in an upper portion of the codeNum mapping table and the other remaining intra-prediction modes are backed may be used. Namely, a method in which intra-prediction modes of the blocks existing on the left and the upper side are positioned in upper portion on the codeNum mapping table, and thereafter, the other remaining intra-prediction modes, excluding the intra-prediction modes of the blocks existing on the left and the upper side, are disposed on the codeNum mapping table may be used to generate a codeword corresponding to the intra-prediction mode.

In the foregoing codeNum mapping table rearranging method, it is on the premise that an intra-prediction mode of a specific prediction block is highly likely to be identical to at least one of intra-prediction modes of the blocks existing on the left and/or the upper side of the specific prediction block. Thus, rearranging of the foregoing codeNum mapping table may be minimized by disposing a relatively frequently generated intra-prediction mode in an upper portion of the codeNum mapping table. Here, the frequently generated intra-prediction mode may be an intra-prediction mode of the blocks existing on the left and/or the upper side of the specific prediction block or may not. If the frequently generated intra-prediction mode is an intra-prediction mode of blocks existing on the left and/or upper side of the specific prediction block, a probability of rearrangement is relatively reduced, preventing unnecessary rearrangement. Conversely, if the frequently generated intra-prediction mode is not an intra-prediction mode of blocks existing on the left and/or upper side of the specific prediction block, when the codeNum mapping table is rearranged by positioning an intra-prediction mode of the blocks existing on the left and/or upper side of the specific prediction block in an upper portion of the codeNum mapping table and backing the other remaining intra-prediction modes, a frequently generated intra-prediction mode among the other remaining intra-prediction modes needs to be mapped to a relatively small codeNum in order to be allocated a shorter codeword. As a result, no matter whether the frequently generated intra-prediction mode is identical to the intra-prediction modes of the blocks existing on the left and/or the upper side of the specific prediction block or not, it may be advantageous for the frequently generated intra-prediction mode to be allocated a smaller codeNum number, in terms of compression performance and/or complexity.

In another embodiment, in binary-coding an intra-prediction mode, binary-coding may be performed using an MPM. However, a codeword with respect to an MPM may be allocated using a method of rearranging a codeNum mapping table based on intra-prediction mode information of a first MPM and a second MPM of a specific prediction block without generating flag information for the MPMs. For example, when intra-prediction modes of the first MPM and the second MPM are 2 and 3, respectively, a codeNum mapping table may be configured by positioning 2 and 3 in an upper portion of the codeNum mapping table and backing other intra-prediction modes. Other processes may be the same as those of the embodiment of positioning the intra-prediction mode of the blocks existing on the left and the upper side of a specific prediction block in an upper portion of a codeNum mapping table.

According to an embodiment of the present invention, different number of intra-prediction modes may be used according to a size of a prediction block. Table 7 show the number of intra-prediction modes that may be used according to sizes of a prediction block.

TABLE 7

| log2PUSize | intraPredModeNum |
|---|---|
| 2 (4 × 4) | 11, 18, or 19 |
| 3 (8 × 8) | 35 |
| 4 (16 × 16) | 35 |
| 5 (32 × 32) | 35 |
| 6 (64 × 64) | 11, 18, or 19 |

Referring to Table 7, when a size of a prediction block is 4×4 or 64×64, eleven, eighteen, nineteen intra-prediction modes may be used. Also, when sizes of a prediction block are 16×16, 32×32, and 64×64, thirty-five intra-prediction modes may be used.

Thirty-five intra-prediction modes may have intra-prediction mode numbers and corresponding names as shown in Table 8 below.

TABLE 8

| Intra Prediction mode | Intra Prediction angle |
|---|---|
| 0 | Planar |
| 1 | DC |
| 2 | Ver |
| 3 | Hor |
| 4 | Ver − 8 |
| 5 | Ver − 4 |
| 6 | Ver + 4 |
| 7 | Ver + 8 |
| 8 | Hor − 4 |
| 9 | Hor + 4 |
| 10 | Hor + 8 |
| 11 | Ver − 6 |
| 12 | Ver − 2 |
| 13 | Ver + 2 |
| 14 | Ver + 6 |
| 15 | Hor − 6 |
| 16 | Hor − 2 |
| 17 | Hor + 2 |
| 18 | Hor + 6 |
| 19 | Ver − 7 |
| 20 | Ver − 5 |
| 21 | Ver − 3 |
| 22 | Ver − 1 |
| 23 | Ver + 1 |
| 24 | Ver + 3 |
| 25 | Ver + 5 |
| 26 | Ver + 7 |
| 27 | Hor − 7 |
| 28 | Hor − 5 |
| 29 | Hor − 3 |
| 30 | Hor − 1 |
| 31 | Hor + 1 |
| 32 | Hor + 3 |
| 33 | Hor + 5 |
| 34 | Hor + 7 |

Figure 7:
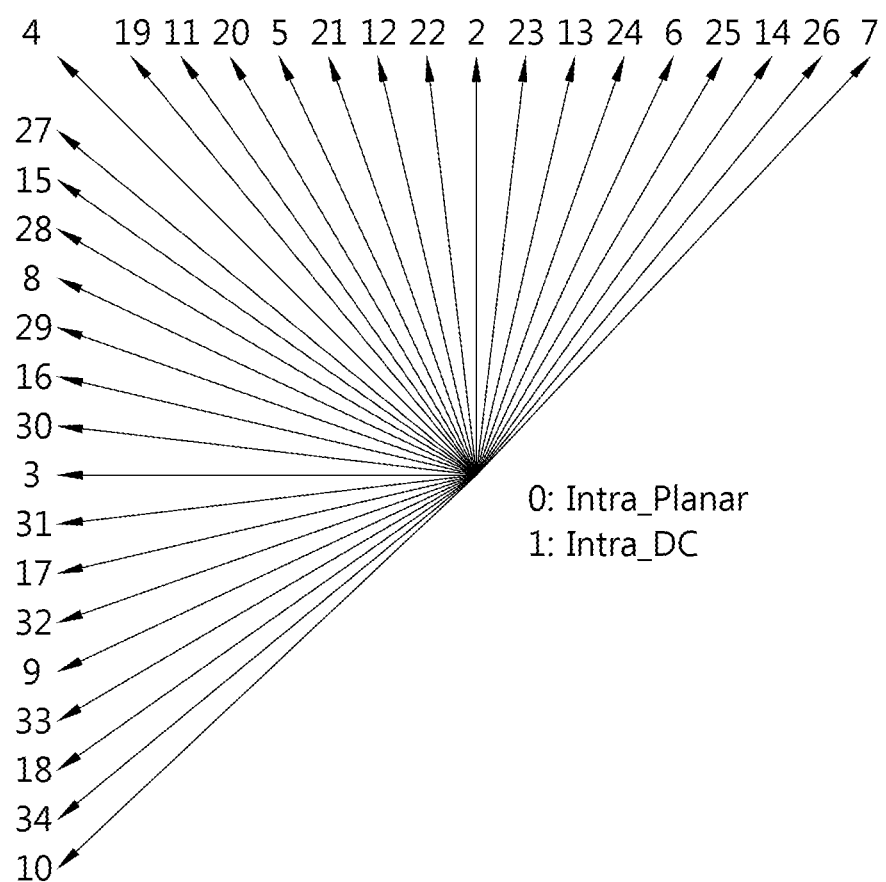
FIG. 7 is a view illustrating non-directional intra-prediction modes and directional intra-prediction modes when thirty-five intra-prediction modes are used according to an embodiment of the present invention.

FIG. 7 is a view illustrating non-directional intra-prediction modes and directional intra-prediction modes when 35 intra-prediction modes are used according to an embodiment of the present invention.

In a case in which 35 intra-prediction modes are used to perform intra-prediction on a prediction block, the modes may be planar, DC, Ver+x (x is an integer between −8 to 8), or Hor+x (x is an integer from −7 to 8).

Figure 8:
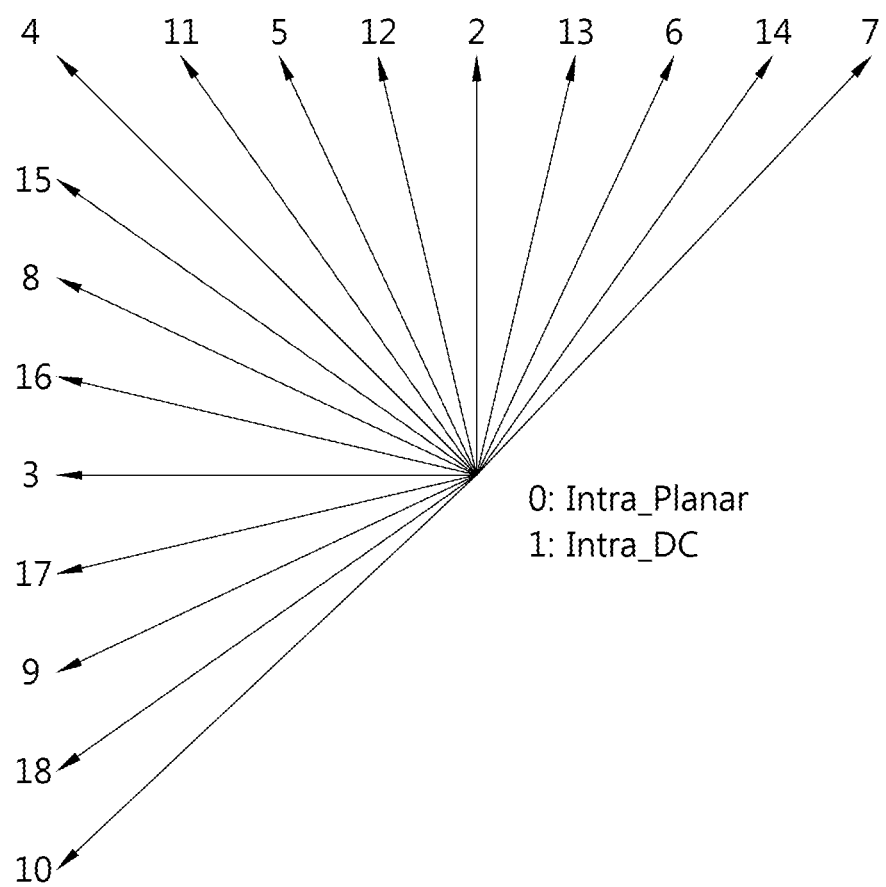
FIG. 8 is a view illustrating non-directional intra-prediction modes and directional intra-prediction modes when nineteen intra-prediction modes are used according to an embodiment of the present invention.

FIG. 8 is a view illustrating non-directional intra-prediction modes and directional intra-prediction modes when 19 intra-prediction modes are used according to an embodiment of the present invention.

In a case in which nineteen intra-prediction modes are used to perform intra-prediction on a prediction block, the modes may be planar, DC, Ver+2x (x is an integer between −4 to 4), or Hor+2x (x is an integer from −3 to 4). Namely, unlike the case of using 35 intra-prediction modes in FIG. 7, in case of using the 19 intra-prediction modes, a method of selecting only intra-prediction modes with respect to an angle movement by multiple of 2 each time in vertical and horizontal directions.

In case of using 18 intra-prediction modes, a method of performing intra-prediction using intra-prediction modes from 0 to 17, excluding 18 intra-prediction mode, may be used.

Figure 9:
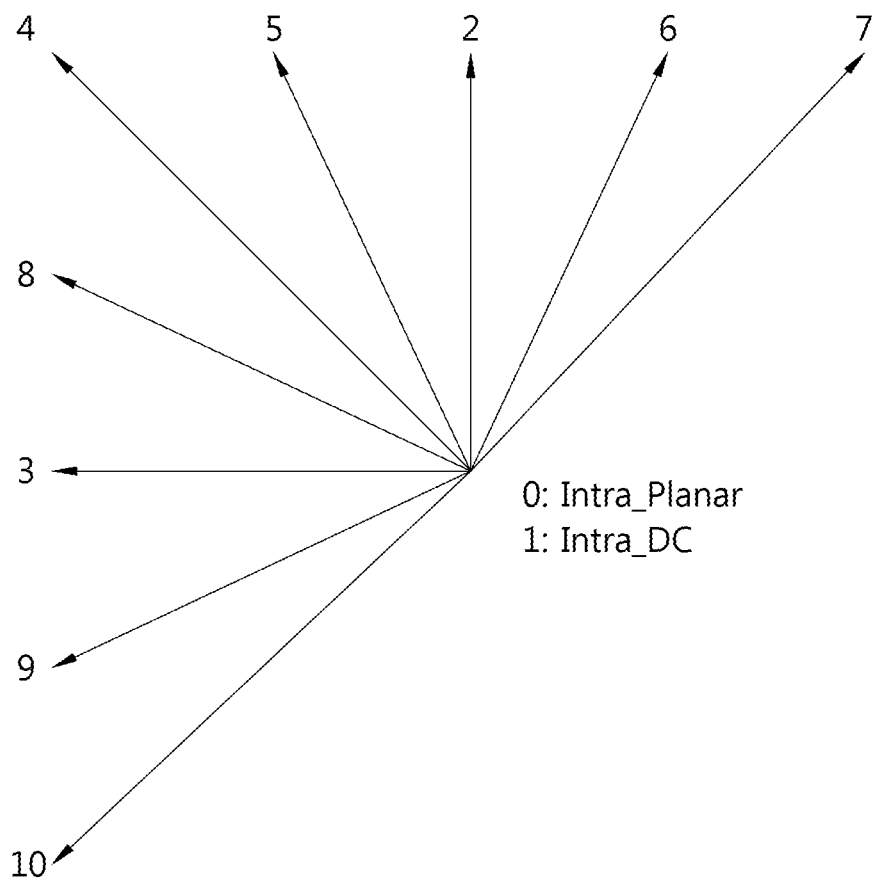
FIG. 9 is a view illustrating non-directional intra-prediction modes and directional intra-prediction modes when eleven intra-prediction modes are used according to an embodiment of the present invention.

FIG. 9 is a view illustrating non-directional intra-prediction modes and directional intra-prediction modes when 11 intra-prediction modes are used according to an embodiment of the present invention.

In case of using 11 intra-prediction modes, the modes may be planar, DC, Ver+4x (x is an integer between −2 and 2), or Hor+4x (x is an integer between −1 to 2). Namely, unlike the case of using 35 intra-prediction modes in FIG. 7, in case of using the 11 intra-prediction modes, a method of selecting only intra-prediction modes with respect to an angle movement by multiple of 4 each time in vertical and horizontal directions. In case of the 11 intra-prediction modes, a corresponding space is quartered based on VER (mode 2) and HOR (mode 3) to generate 9 modes from mode 4 to mode 10 as illustrated in FIG. 9. When the planar (mode 0) and the DC mode (mode 1) are added to the corresponding 9 modes, a total of 11 modes may be configured.

Figure 11:
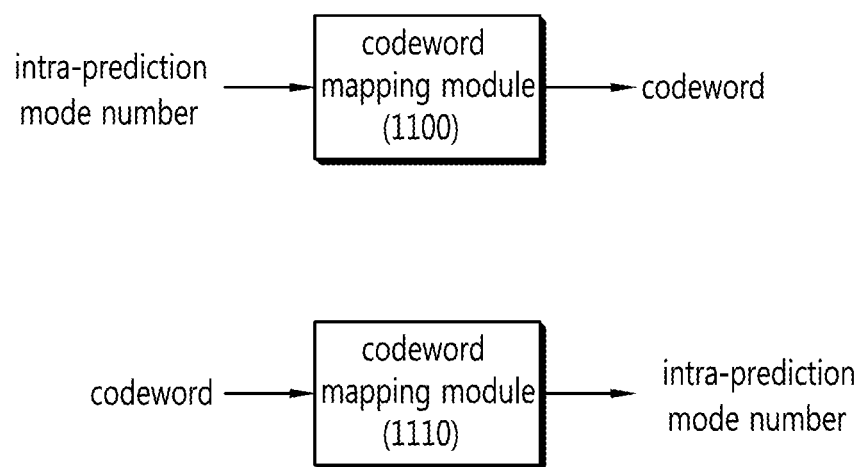
FIG. 11 is a conceptual view illustrating portions of a video encoding apparatus and a video decoding apparatus respectively performing encoding and decoding of an intra-prediction mode according to an embodiment of the present invention.

As illustrated in FIGS. 8 and 9, 11 intra-prediction modes and 19 intra-prediction modes may be used in a 64×64 block or 4×4 block.

When a size of a prediction block is 64×64, it may mean that there is no need to partition the corresponding block into smaller (for example, 32×32, 16×16, or the like), and it may be determined that there is no significant change in pixel values of the corresponding block. Thus, when the entire 35 modes are evaluated over the flat block, prediction values with respect to the most intra-prediction modes are obtained to be similar, not significantly making a difference in performance of each mode having similar directivity. Thus, when complexity is taken into consideration, it may be advantageous to perform intra-prediction based on only some intra-prediction modes, rather than evaluating all of the 35 modes, in terms of complexity. Thus, in an embodiment of the present invention, as illustrated in FIGS. 8 and 9, inter-prediction may be performed using any one of the 11 intra-prediction modes, 18 intra-prediction modes, and 19 intra-prediction modes with respect to a 64×64 prediction block.

Also, in case of a prediction block having a size of 4×4, since the size of the prediction block is small, prediction values of the 35 intra-prediction modes may be similar, and thus, inter-prediction may be performed using one of 11 intra-prediction modes, 18 intra-prediction modes, and 19 intra-prediction modes as in the prediction block having the size of 64×64, rather than using all of the 35 intra-prediction modes.

As described above, in the case in which 11 intra-prediction modes, 19 intra-prediction modes, or 35 intra-prediction modes are used and the number of MPM modes is 3, coding efficiency may be increased by generating a codeNum mapping table with respect to a remaining mode excluding the MPMs.

Hereinafter, an MPM used in an embodiment of the present invention is used as having a general concept of a candidate intra-prediction mode predicting an intra-prediction mode value of a current block, and a most probable remaining mode (MPRM) having a similar concept may also be used and included in the scope of the present invention, but only an MPM will be described for the purposes of description.

FIG. 10 is a conceptual view illustrating a codeNum mapping method with respect to remaining intra-prediction mode excluding MPM according to an embodiment of the present invention.

Referring to FIG. 10, in a case in which MPMs are 2, 4, and 5 as intra-prediction mode numbers, codeNum mapping may be performed on the other remaining intra-prediction modes excluding 2, 4, and 5, in the codeNum mapping table. Namely, in remaining mode coding, an intra-prediction mode corresponding to an MPM is not selected, and thus, codeNum values may be assigned only to remaining modes excluding the MPMs. The codeNum values may be mapped to codewords by using a codeword mapping table. In this manner, codewords are mapped only to intra-prediction modes corresponding to remaining modes, an unnecessary waste of codewords may be prevented, increasing coding efficiency.

Similarly, in case of performing a decoding operation, codeNum may be generated based on an input codeword, and intra-prediction mode information may be decoded using a codeNum mapping table in which intra-prediction modes, excluding intra-prediction modes corresponding to MPMs, are mapped.

FIG. 10 illustrates a case of using 11 intra-prediction modes. intra-prediction performed on a prediction block using 11 intra-prediction modes and 3 MPMs are used, codewords may be mapped to 8 remaining intra-prediction modes. When the remaining intra-prediction modes are expressed by a fixed length, codewords with respect to remaining 8 intra-prediction modes may be mapped by a 3-bit code length.

Table 9 below shows remaining intra-prediction modes by a fixed length according to an embodiment of the present invention.

TABLE 9

| codeNum | Codeword |
|---|---|
| 0 | 000 |
| 1 | 001 |
| 2 | 010 |
| 3 | 011 |
| 4 | 100 |
| 5 | 101 |
| 6 | 110 |
| 7 | 111 |

As illustrated in FIG. 9, code numbers may be mapped to codewords using fixed length coding.

In this manner, when the number of intra-prediction modes are 11, 19, and 35, and the number of MPMs is 3, the number of remaining modes are 8, 16, and 32, and thus, the total number of the entire remaining modes is exponentiation of 2, and the remaining modes are expressed by fixed lengths of respective exponent bits. Table 10 show lengths of codewords indicating remaining modes when code numbers are expressed by fixed lengths of exponent bits according to the number of remaining modes.

TABLE 10

| IntraPredModeNum | Remaining node number | Code length |
|---|---|---|
| 11 | 8($2^3$) | 3 bits |
| 19 | 16($2^4$) | 4 bits |
| 35 | 32($2^5$) | 5 bits |

Referring to Table 10, in a case in which the number of intra-prediction modes is 11 and the number of MPMs is 3, 3-bit codeword representing a remaining mode may be used. In a case in which the number of intra-prediction modes is 19 and the number of MPMs is 3, 4-bit codeword representing a remaining mode may be used. In a case in which the number of intra-prediction modes is 35 and the number of MPMs is 3, 5-bit codeword representing a remaining mode may be used. Namely, according to an embodiment of the present invention, the number of intra-prediction modes of a current block may be generated by an exponentiation of 2 of the number of corresponding remaining intra-prediction modes, namely, it may be determined that the remaining modes are expressed by fixed lengths of respective exponent bits. In the foregoing embodiment, the number of MPMs is assumed to be 3, and when the number of MPMs is different, the number of intra-prediction modes used for intra-prediction of a prediction block may be changed.

FIG. 11 is a conceptual view illustrating portions of a video encoding apparatus and a video decoding apparatus respectively performing encoding and decoding of an intra-prediction mode according to an embodiment of the present invention.

Referring to the upper portion in FIG. 11, a codeword mapping module 1100 of a video encoding apparatus may receive an intra-prediction mode number and generate a codeword. In order to perform codeword mapping as described above, the codeword mapping module 1100 may have a codeword mapping table stored therein or may perform a binarization operation to generate a codeword mapping table. The codeword mapping module 1100 may be included in a entropy coding module and operate. As described above, a codeword mapping table may be generated such that a small intra-prediction mode number may be given to a non-directional intra-prediction mode such as a DC mode or a planar mode having a high incidence among intra-prediction modes and a shorter codeword is mapped to a smaller intra-prediction mode number.

Referring to a lower portion in FIG. 11, a codeword mapping module 1110 of a video decoding apparatus receives a codeword and generate the input codeword as an intra-prediction mode number based on a codeword mapping table included in the codeword mapping module 1110.

Figure 12:
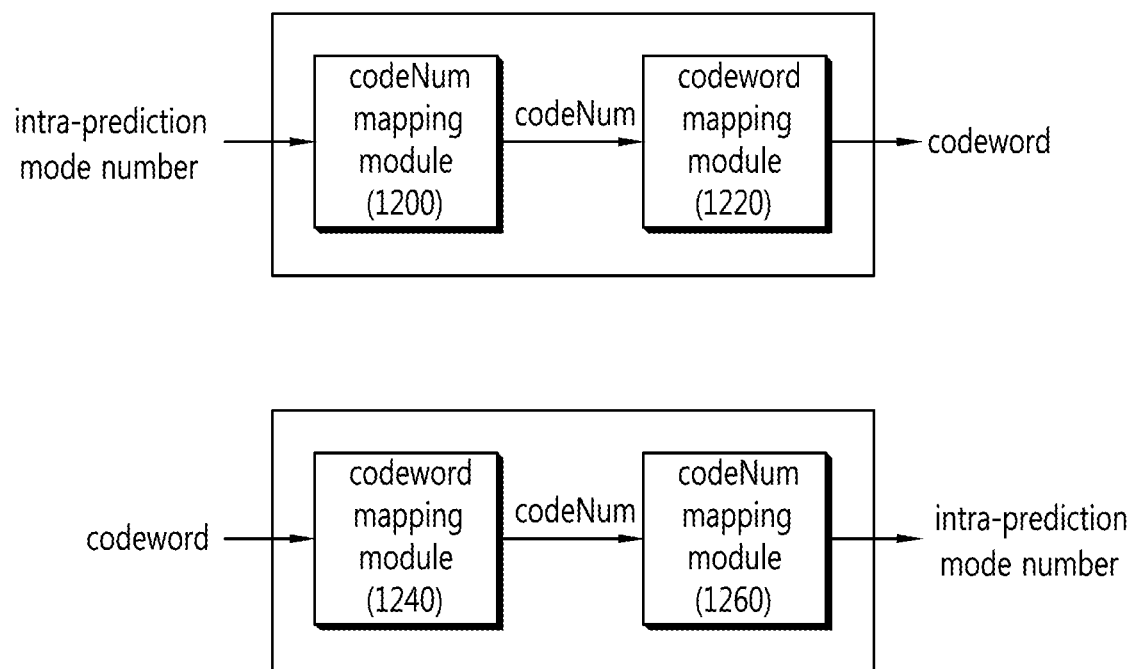
FIG. 12 is a conceptual view illustrating portions of a video encoding apparatus and a video decoding apparatus respectively performing encoding and decoding of an intra-prediction mode according to an embodiment of the present invention.

FIG. 12 is a conceptual view illustrating portions of a video encoding apparatus and a video decoding apparatus respectively performing encoding and decoding of an intra-prediction mode according to an embodiment of the present invention.

Referring to an upper portion in FIG. 12, a codeNum mapping module 1200 and a codeword mapping module 1220 may be included in a video encoding apparatus. The codeNum mapping module 1200 of the video encoding apparatus may receive an intra-prediction mode number and output a codeNum. The codeNum mapping and codeword mapping according to the embodiments as described above may be performed, and a more frequently generated intra-prediction mode number may be mapped to a smaller codeNum number. As described above, in case of using a method of performing codeNum mapping excluding an MPM, the codeNum mapping module may perform codeNum mapping on remaining intra-prediction modes excluding an intra-prediction mode corresponding to the MPM.

Referring to a lower portion in FIG. 12, a video decoding apparatus may include a codeword mapping module 1240 and a codeNum mapping module 1260. The codeword mapping module 1240 may output a codeNum based on an input codeword, and the codeNum mapping module 1260 may receive the codeNum and output an intra-prediction mode number. The codeword mapping module 1240 may include a codeword mapping table for performing codeword mapping, and the codeNum mapping module 1260 may include a codeNum mapping table for outputting an intra-prediction mode number based on a received codeNum. The codeword mapping table and the codeNum mapping module may be stored in advance or adaptively generated.

What is claimed is:

1. A decoding method of an intra-prediction mode, the method comprising:

decoding flag information indicating whether one of candidate intra-prediction modes with respect to a current block and an intra-prediction mode of the current block are identical;

when the one of the candidate intra-prediction modes with respect to the current block and the intra-prediction mode of the current block are identical, deriving the intra prediction mode of the current block by decoding a syntax element of information regarding the candidate intra-prediction modes with respect to the current block;

when the candidate intra-prediction modes with respect to the current block and an intra-prediction mode of the current block are not identical, deriving the intra-prediction mode of the current block by decoding a syntax element of remaining intra-prediction mode information comprising information regarding the intra-prediction mode of the current block; and generating a prediction block of the current block based on the derived intra-prediction mode of the current block, wherein, the deriving the intra-prediction mode of the current block is performed based on a table comprising intra-prediction mode information, the table mapping intra-prediction modes and index information of the intra-prediction modes, wherein when an intra-prediction mode is a planar mode, the intra-prediction mode is mapped to an index 0, when an intra-prediction mode is a DC mode, the intra-prediction mode is mapped to an index 1, and when intra-prediction modes are directional intra-prediction modes, the intra-prediction modes are mapped to indices 2 to 34 according to directivity of the intra-prediction modes, wherein a codeword length of an index of the candidate intra-prediction modes with respect to the current block is shorter than a codeword length of an index of the remaining intra-prediction mode information, wherein the candidate intra-prediction modes with respect to the current block are modes for predicting luminance information of the current block, wherein chrominance information of the current block is predicted based on intra-prediction mode information according to the predicting luminance information of the current block, and wherein the syntax element of the remaining intra-prediction mode information is a value coded using fixed 5 bits.

2. An encoding method of an intra-prediction mode, the method comprising:

determining and encoding flag information indicating whether one of candidate intra-prediction modes with respect to a current block and an intra-prediction mode of the current block are identical;

when the one of the candidate intra-prediction modes with respect to the current block and the intra-prediction mode of the current block are identical, encoding a syntax element of information regarding the candidate intra-prediction modes with respect to the current block;

when the candidate intra-prediction modes with respect to a current block and an intra-prediction mode of the current block are not identical, encoding a syntax element of remaining intra-prediction mode of the current block including information regarding the intra-prediction mode of the current block; and generating a prediction block of the current block based on the intra-prediction mode of the current block, wherein the intra-prediction mode of the current block is mapped to index information of the intra-prediction modes based on a table, wherein when an intra-prediction mode is a planar mode, the intra-prediction mode is mapped to an index 0, when an intra-prediction mode is a DC mode, the intra-prediction mode is mapped to an index 1, and when intra-prediction modes are directional intra-prediction modes, the intra-prediction modes are mapped to indices 2 to 34 according to directivity of the intra-prediction modes, wherein a codeword length of an index of the candidate intra-prediction modes with respect to the current block is shorter than a codeword length of an index of the remaining intra-prediction mode information, wherein the candidate intra-prediction modes with respect to the current block are modes for predicting luminance information of the current block, wherein chrominance information of the current block is predicted based on intra-prediction mode information according to the predicting luminance information of the current block, and wherein the syntax element of the remaining intra-prediction mode information is a value coded using fixed 5 bits.

3. A non-transitory computer-readable storage medium storing a bitstream which is encoded by an encoding method, the encoding method comprising:

determining and encoding flag information indicating whether one of candidate intra-prediction modes with respect to a current block and an intra-prediction mode of the current block are identical;

when the one of the candidate intra-prediction modes with respect to the current block and the intra-prediction mode of the current block are identical, encoding a syntax element of information regarding the candidate intra-prediction modes with respect to the current block;

when the candidate intra-prediction modes with respect to a current block and an intra-prediction mode of the current block are not identical, encoding a syntax element of remaining intra-prediction mode of the current block including information regarding the intra-prediction mode of the current block; and generating a prediction block of the current block based on the intra-prediction mode of the current block, wherein the intra-prediction mode of the current block is mapped to index information of the intra-prediction modes based on a table, wherein when an intra-prediction mode is a planar mode, the intra-prediction mode is mapped to an index 0, when an intra-prediction mode is a DC mode, the intra-prediction mode is mapped to an index 1, and when intra-prediction modes are directional intra-prediction modes, the intra-prediction modes are mapped to indices 2 to 34 according to directivity of the intra-prediction modes, wherein a codeword length of an index of the candidate intra-prediction modes with respect to the current block is shorter than a codeword length of an index of the remaining intra-prediction mode information, wherein the candidate intra-prediction modes with respect to the current block are modes for predicting luminance information of the current block, wherein chrominance information of the current block is predicted based on intra-prediction mode information according to the predicting luminance information of the current block, and wherein the syntax element of the remaining intra-prediction mode information is a value coded using fixed 5 bits.

* * * * *